Figure 4:
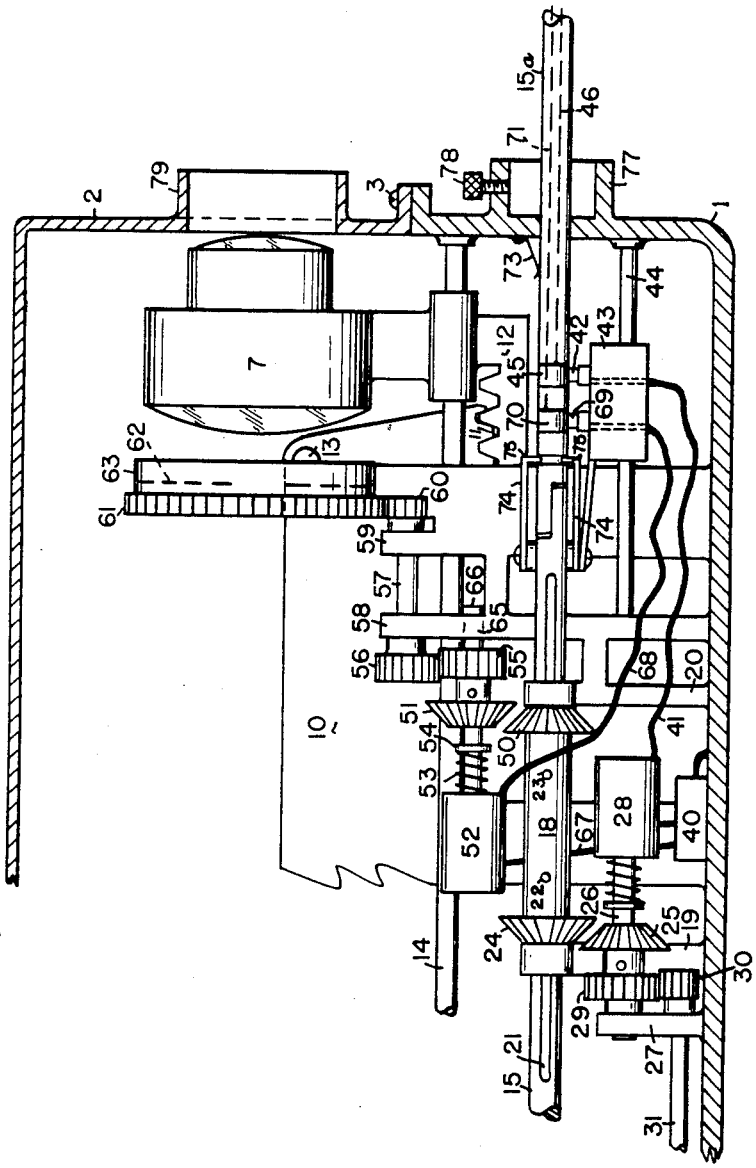

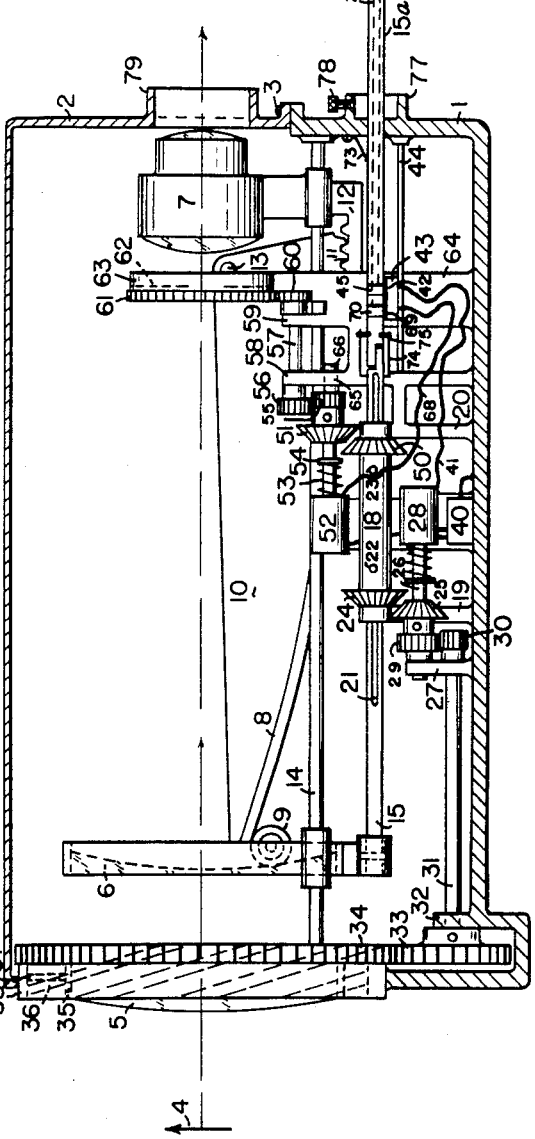
May 16, 1961  J. B. WALKER  2,984,154
ZOOM LENS FOCUSING MECHANISM
Filed June 2, 1958  2 Sheets-Sheet 1
INVENTOR.
JOSEPH B. WALKER
BY Harry R. Lubcke
AGENT May 16, 1961  J. B. WALKER  2,984,154
ZOOM LENS FOCUSING MECHANISM
Filed June 2, 1958  2 Sheets-Sheet 2

INVENTOR.
JOSEPH B. WALKER
BY Harry R. Lubcke
AGENT

# United States Patent Office 2,984,154
Patented May 16, 1961

2,984,154
ZOOM LENS FOCUSING MECHANISM

Joseph B. Walker, Los Angeles, Calif.
(617 N. La Peer Drive, West Hollywood 46, Calif.)

Filed June 2, 1958, Ser. No. 739,340

12 Claims. (Cl. 88—57)

My invention relates to means for manually focusing a variable focal length lens and particularly to such means combined with means for varying the focal length of said lens in a manner convenient to the operator.

In television particularly, the camera operator is fully engaged in manipulating his camera in order to include the scene desired in the television picture, in focusing, and in zooming toward and away from the scene when a variable focal length lens is a part of the optical system of the camera. It is of importance that each of these processes be as easily and accurately accomplished as possible in order to permit the cameraman to give a smooth performance.

On the now relatively standard television camera a rod having a hand grip at the rear of the camera is an established control. When several ordinary lenses are employed on a turrett this grip is used to change from one lens to another. For a variable focal length lens it may be used to manually change the focal length; i.e., to "zoom," by axial translation by the operator. Besides zooming, a variable focal length lens must also be focused, according to the distance from the desired scene to the camera.

In this invention I provide means for focusing a variable focal length lens by the same rod and hand grip familiar to the cameraman and also used for zooming. However, this is done by novel means which avoid critical manipulation in order that the two functions be maintained separate.

The zoom action is accomplished by translating the rod as is now relatively standard for manual control of such variable focal length lenses as described in my prior United States Patents Nos. 2,515,104, July 11, 1950; 2,532,685, December 5, 1950; and 2,547,187, April 3, 1951. By rotation of the rod described I now provide focusing control for the variable focal length lens, but only at such times as intentionally desired by the operator. This allows him to make any zoom adjustments without having to exercise care that he does not rotate the hand grip. Were he to rotate the same unintentionally without my invention the image would go out of focus in a random manner. When it is understood that he must translate the rod a distance usually not less than five inches but as much as eight inches for a full zoom it is seen that he might easily rotate the rod inadvertently when he is also busy keeping the desired scene in frame. For moving shots this latter requires simultaneous panning and tilting.

Accordingly, I arrange a mechanical system with electrical control to be effective for focusing only when an electric switch is actuated by the camera operator. This switch may be made a part of the rod grip if desired. Thus, the operator may engage in all his necessary manipulations and rotate the zoom rod as he zooms. This is a natural and convenient kind of motion; one happily indulged in when this is not restricted.

When focusing is required, however, pressure upon my switch causes rotation of the handle to focus the lens as long as the switch is held down. Actuation of the switch brings a gear train together, or, alternately, provides mechanical coupling between coaxial shafts by means of a magnetic clutch which brings the focusing mechanism into play.

By similar means I also make it possible to selectively change the optical aperture (iris setting) of the variable focal length lens. For this a duplicate of the electromechanical means described causes rotation of the same handle to control the opening of the iris when a different switch is actuated.

An object of my invention is to provide a mechanism for selectively focusing a variable focal length lens by the same manual control normally employed for changing the focal length thereof.

Another object is to allow full freedom of manipulation of the manual control for zooming a variable focal length lens when focusing of the lens is not desired.

Another object is to allow alternate focusing or iris control by the manual control for zooming a variable focal length lens.

Another object is to effect a selected combination of variable focal length lens controls by means of a single manual control element by adding an electrical element thereto.

Another object is to simplify the manual control of variable focal length lenses.

Other objects will become apparent upon reading the following detailed specification and upon examining the accompanying drawings, in which are set forth by way of illustration and example certain embodiments of my invention.

Fig. 1 shows a side elevation of a variable focal length lens having means for controlling both focus and aperture as well as zoom by one manual control, Fig. 2 shows a side elevation of an alternate embodiment employed a magnetic clutch, Fig. 3 shows a fragmentary elevation of a horizontally disposed mechanism for translating the focusing lens, and Fig. 4 shows a partial elevation section of Fig. 1 on on an enlarged scale.

In Fig. 1 numeral 1 indicates the lower portion of a rectangular housing. This also serves as the base upon which the several elements are mounted. Surmounting this is the upper portion 2 of the housing. The two are attached by a plurality of screws 3, of which one is seen at the rear of the lens structure in Fig. 1.

The optical structure may be comprised of my known "Electrazoom" variable focal length lens elements, as have been described in U.S. Patents 2,506,947; 2,515,104; 2,547,187 and 2,532,685.

An object 4 in the field of view is imaged by first converging lens 5, diverging lens 6 and second converging lens 7 upon the well known sensitive image-receiving surface. This is in a television or similar camera located to the right of housing 1, 2, and is not known.

As also disclosed in the recited patents, the cam 8 provides the required non-linear motional relation between diverging lens 6 and second converging lens 7. A cam follower 9 is attached to the movable structure of lens 6. Through cam plate 10, having gear teeth 11 on a sectored portion and a meshing rack on movable support 12, the required motion of lens 7 is provided. The cam plate has a fulcrum at 13. Lenses 6 and 7 slide upon two rods, one, 14, of which may be seen in Fig. 1, the other being directly behind.

The translation of lens 6 required to change the focal length of the lens system is manually accomplished in this embodiment by longitudinal movement of rod 15 through translation of the right-hand portion 15a. This coupled rod is relatively long and normally passes through the center of the central tubing of a television camera that is utilized to rotate the lens turret when non-variable focal length lenses are employed. It is shown broken at the right in Fig. 1, according to usual drafting practice. Hand grip 16 extends from the rear of the camera and provides the necessary means for controlling the variable focal length lens. This grip is immediately in front of the operator but the lens is far removed from him; thus the importance of combining all the adjustments of the lens at this one control.

Electro-mechanical means for accomplishing the focusing action by turning the hand grip 16 are energized by depressing the lower electric switch 17 on that grip, as with the thumb.

Within the lens, sleeve 18 surrounds rod 15. The sleeve is held from translation with the rod by bearings 19 and 20. Rod 15 is provided with a longitudinal slot 21, which is slightly longer than the distance the rod is translated. Two pins 22 and 23 are firmly fastened in sleeve 18 and ride in slot 21. This allows free translation of the rod and also rotation of the sleeve when the rod is rotated.

Firmly attached to sleeve 18 is bevel gear 24. A companion bevel gear 25 is fastened to adjacent shaft 26. This shaft is journaled in bearing 27 and also in electromagnet 28. When energized electrically, electromagnet 28 translates gear 25 into mesh with gear 24. In this configuration, rotation of rod 15 results in a corresponding rotation of bevel gear 25. On the same shaft gear 29 also rotates and drives meshing pinion 30 on shaft 31. This latter shaft is journaled at 27 and 32 and has somewhat large gear 33 fastened to the end thereof away from the pinon. Gear 33 meshes at all times with ring gear 34, which surrounds lens 5. This lens is mounted in a ring 35 having a triple thread of coarse pitch which mates with a surrounding ring 36 driven by ring gear 34. A pin 37 slides in a slot in stationary ring 38 to cause rotation of the ring gear to translate lens 5 rather than to rotate it. Approximately one inch travel is required to provide adequate focus adjustment in the lens embodiment described.

Electrical energization of electromagnet 28 is accomplished by connecting the same to a suitable electrical source 40. This may be a battery of a few volts or a step-down transformer and silicon rectifier, the transformer being connected to the usual alternating current power. One short wire lead connects between source 40 and electromagnet 28. Another short lead from source 40 connects to housing 1 as the ground return circuit. A second wire lead 41 from electromagnet 28 connects to brush 42 of translatable brush holder 43. The latter rides in track 44 attached to housing 1 so that electrical contact may be had with slip ring 45 no matter where the rod 15a has been translated. Slip ring 45 is electrically connected by means of insulated wire 46 to the insulated contact of switch 17. Rod 15 and grip 16 are suitably hollow so that wire 46 may be accommodated.

In this manner I accomplish adjustment of the most important parameters of a variable focal length lens; zoom and focus. Independence of adjustment is had because of the use of electrical energization means.

For adjusting the aperture of the variable focal length lens independent of other adjustments but by the same manual means I duplicate the means previously described to adjust the focus.

Bevel gear 50 is fastened to sleeve 18 oppositely to prior bevel gear 24. Gear 50 meshes with companion bevel gear 51 when electromagnet 52 is energized. When it is not energized compression spring 53 acting against collar 54 disengages the two gears. Gear 55 is in constant mesh with gear 56. The latter is on one extremity of shaft 57, which shaft is journaled in bearings 58 and 59 and has pinion 60 on the opposite extremity. Pinion 60 meshes with ring gear 61, which latter opens and closes the iris shutter 62 upon being rotated in the known manner. Iris housing 63 is supported by support 64 to housing 1. The iris shutter 62 is located in front of second converging lens 7 to control the optical aperture of the lens system at the proper plane in the optical path but at the same time it is positioned to avoid obstructing the necessary motion of lens 7. The support for bearing 58 also provides bearing 65 for shaft 66, which shaft is further journaled in electromagnet 52.

As before, wire 67 from electromagnet 52 connects to electrical source 40 and wire 68 to brush 69. This brush is coactive with insulated slip ring 70, which in turn is connected to insulated wire 71. This wire passes through hollow rod 15a and grip 16 to the second switch or pushbutton 72, which is also conveniently located upon the grip to be depressed by the operator's thumb. The second terminal of switch 72 is grounded, completing the circuit through rod 15a and housing 1 to source 40. A Phosphor bronze spring finger 73 inside housing 1 at the point where the rod enters bears upon the rod to insure good electrical contact for the return circuit.

While a considerable variation of the gear ratios involved in the rotational adjustments is possible I prefer to have all the gears in the train which drive the final shaft in each case (i.e., shafts 31 and 57) give an increase in speed; that is, a large gear driving a smaller gear. This is to counteract the speed reduction between the final gear and the ring gears. The object is to obtain as much adjustment with one turn of grip 16 as possible.

In removing the variable focal length lens from the camera it is necessary to disengage rod 15a from the general structure of housing 1. Accordingly, two spring clip arms 74 are fastened to the left hand portion of the rod, 15, having claws 75 which fit into depressions in the right hand portion, 15a. In addition, a lap joint end of a half circumference is provided at each of the rod ends. This provides a firm joint to the rods so that when the grip 16 is rotated the sleeve 18 will likewise rotate. For disengaging the rods the arms are pulled apart and grip 16 pulled away from housing 1.

A fastening boss 77 is also provided to allow the lens structure to be accurately positioned with respect to the camera. This boss fits over the turret stud on the camera, the turret per se having often been taken off with the several ordinary lenses which it carries. Thumb screw 78 is provided to tighten the boss to the stud. A general support for the lens housing 1 with respect to the camera is ordinary and so has not been shown. An additional rear tubulation 78 is provided to fit into the optical path hole in the camera to eliminate extraneous light.

In the alternate embodiment of my invention shown in Fig. 2 the sliding sleeve 18 of the embodiment of Fig. 1 is replaced by a gear 80. This gear is fastened rigidly to rod 15 in one place, thus as the rod is translated for zooming the gear moves axially with it. A forward bearing is provided for rod 15, 15a by a sliding bearing arranged around the gear. The journals proper are 81 and 82, located on each side of the gear. Two auxiliary stationary rods 83 and 84 provide a stable sliding means upon which sleeves 85 and 86 slide.

A long pinion 87 is journaled in supports 88 and 89 so as to be parallel to rod 15 and in mesh with gear 80 no matter where this gear may be as the rod is translated. Gear 90, on the same shaft as pinion 87, transmits rotary motion to companion gear 91 on shaft 92, which is also journaled in support 89.

Element 93 is a magnetic clutch, one side of which is rigidly fastened to shaft 92 and the other to shaft 94. Wire 41', corresponding electrically and functionally to wire 41 of Fig. 1, connects to brush 95 in brush holder 96 and bears upon slip ring 97 of the magnetic clutch. This circuit is completed through slip ring 98, brush 99 and wire 100 to the housing 1'. Accordingly, when switch 17 is depressed (Fig. 1) the coil of magnetic clutch 93 is energized and the shaft 94 driven strictly according to the rotation of shaft 92. When the magnetic clutch is not energized shaft 94 is free.

Shaft 94 is journaled in support 88 and gear 33 is attached on the forward side of that support. This drives ring gear 34 (Fig. 1) and so focuses lens 5. Support 101 forms the second fastening for auxiliary rods 83 and 84 but is not located at the same place front to back through the paper in Fig. 2, as is rod 15a.

In the embodiment of Fig. 3 there is shown still another mechanism for handling the rotational aspects of the plural lens control means. In this embodiment the mechanism is disposed horizontally rather than vertically as in the previous figures. Considerably less space is required below the optical system of the variable focal length lens in this embodiment.

In Fig. 3, bevel gear 103 is attached to sleeve 18 on rod 15 the same way as gear 24 in Fig. 1, except that the gear is reversed end for end. Because of the horizontal disposition of this assembly, the elements just recited lie behind those now to be described.

Bevel gear 104 is adjacent to bevel gear 103 and corresponds to gear 25 in Fig. 1. Electromagnet 105 is adjacent colinearly thereto and is similar to prior electromagnet 28. The portion of shaft identified as 106 is made of brass or of an equivalent non-magnetic material, while portion 107 is made of the usual steel. These two portions are joined near the right end and inside of the electromagnet 105. When the electromagnet is energized via wire 41' the composite shaft moves to the left, as shown by the arrow. An electromagnet causes motion to decrease the reluctance of the magnetic circuit associated with it, thus the motion is to include more of the steel portion 107 within the electromagnet when it is excited.

This motion brings bevel gears 103 and 104 into mesh and so transmits rotation of rod 15 to shaft 106. Colinear shaft 108 is fastened to shaft 106 by means of spline 109. This allows axial motion of shaft 106 to mesh the bevel gears without axial motion of shaft 108. The latter shaft is journaled in housing 1" at 110 and worm 111 is rigidly fastened to that shaft directly adjacently.

First converging lens 5 is mounted in a cylindrical tube 112, which is nested within a surrounding stationary tube 113. A plurality of pins 114 are fastened to tube 112 and slide through a slot in tube 113 to engage in the grooves of the worm 111. It is apparent that as shaft 108 is rotated lens 5 will be translated and so the desired focusing action is accomplished. As before, a spring 115 moves the bevel gears out of mesh when electromagnet 105 is not energized by electric current.

Further embodiments are possible; such as disposing any of the bevel gear assemblies at an acute angle to the bottom of the housings 1, 1' or 1", rather than vertically or horizontally as has been illustrated. The various longitudinal and transverse proportions of the gearing systems may also be altered. Crown gears rather than bevel gears may be employed. Although bevel gears are usually employed for gearing between shafts at right angles I have found that usual bevel gears perform satisfactorily in the manner in which I have employed them. If desired, the shape of the teeth on the bevel gears may be slightly altered to increase the wearing qualities in my configuration; however, wear has not been a practical problem. Helical gears may also be employed where spur gears have been shown for added precision of the assemblies.

With a stationary actuating coil coaxial with the rotating structure for energizing the magnetic clutch of Fig. 2 the brushes and slip rings shown may be omitted.

Rather than two switch means 17 and 72 on grip 16, one double-depressable type switch may be employed. This may be flush mounted with the rear of the handle. In this modification, depressing one end of the see-saw operating surface closes one electrical circuit and depressing the other end closes the other. Under certain conditions of operation the switches may be preferred at another location in the operating area on the camera. In this case, wires 46 and 71 are merely run to the desired location and the switch means there located.

My mechanism for adjusting a plurality of variable focal length lens parameters has been illustrated in connection with a lens of this type utilizing an elongated cam. All types of variable focal length lenses employ at least one translatable lens element and this may be adjusted with my mechanism as has been shown. Where two or more lens elements are to be translated, these are merely joined by a suitable holding structure and the whole translated by my arrangement. Although translation of one lens, such as 5, invariably accomplishes focusing plural such elements may be ganged as easily understood from this teaching. My mechanism may easily be varied to correspond to the positions of particular optical elements of any zoom lens by merely varying the axial position of, or extending a shaft of, the gear assemblies involved.

Still other modifications may be made in arrangement, size, proportions and shape of the illustrative embodiments shown without departing from the scope of my invention.

Having thus fully described my invention and the manner in which it is to be practiced, I claim:

1. A variable focal length lens selectively adjusting mechanism for adjusting a variable focal length lens having all axially movable optical elements by manual means, comprising an operative member attached to at least one of said movable optical elements for adjusting the focal length of said variable focal length lens by longitudinal translation of said member, two mechanical means associated with said member and operative by rotation of said member, reciprocative electro-mechanical means positioned for operable connection to each said mechanical means, mechanical means to focus said variable focal length lens, said means to focus connected to one said electro-mechanical means, mechanical means to alter the optical aperture of said variable focal length lens, said means to alter connected to the other said electro-mechanical means, two electrical circuit energizing means, one said energizing means electrically connected to one said electro-mechanical means to operate the mechanical means positioned for connection operatively connected thereto, said energizing means disposed in relation to said member to allow convenient actuation of said energizing means simultaneously with manual operation of said member, said means to focus operated by actuating one of said energizing means and rotating said member, and said means to alter the optical aperture operated by actuating the other said energizing means and rotating said member.

2. A variable focal length lens adjusting mechanism for selectively adjusting plural optical parameters of a variable focal length lens having three movable lens elements by single manual means comprising a translative-rotative rod, said rod attached to one of said movable lens elements for adjusting the focal length of said variable focal length lens by longitudinal translation of said rod, two gear means slideably connected to said rod and operative by rotation of said rod, solenoidal electro-mechanical means positioned for operable connection to each said gear means, movable optical means to focus said variable focal length lens, said means to focus connected to one said electro-mechanical means, means to alter the optical aperture of said variable focal length lens, said means to alter operatively connected to the other said electro-mechanical means, two switch means, one said switch means electrically connected to one said electro-mechanical means to operate the gear means operatively connected thereto, both said switch means disposed upon said rod to allow manual actuation of either said switch means concomitantly with manual operation of said rod, said means to focus actuated by actuating one said switch means and simultaneously rotating said rod, and said means to alter the optical aperture actuated by actuating the other said switch means and simultaneously rotating said rod.

3. A variable focal length lens adjusting mechanism suited for individually adjusting the focal length, the focus, and the aperture of an optical combination of movable lens elements by single manual means, comprising a rod, said rod attached to a diverging element of said movable lens elements for adjusting the focal length of said optical combination by longitudinal translation of said rod, first gear means riding upon said rod, a forward converging element of said movable lens elements connected to second gear means for translation thereby to adjust the focus upon coaction with said first gear means, said first gear means related to said rod for rotation by rotation of said rod at any longitudinally translative position thereof, a magnetic electro-mechanical member, said electro-mechanical member coactive with said second gear means to effect translation of said forward converging element upon the rotation of said rod when said electro-mechanical member is simultaneously energized; an iris, said iris positioned coaxially adjacent to a lens of said optical combination other than the two previously mentioned, a third gear means coactive with said iris, a second magnetic electro-mechanical member, said second electro-mechanical member coactive with said third gear means to effect adjustment of the aperture of said iris upon rotation of said rod when said second electro-mechanical member is simultaneously electrically energized.

4. In a variable focal length lens adjusting mechanism having at least a converging lens, a diverging lens, and a second converging lens, all translatable for variation of optical parameters, single manual means for selectively altering the focal length of said variable focal length lens, for focusing, and for adjusting the aperture of said variable focal length lens comprising, a manually longitudinally operative rod having a slot, said rod attached to said diverging lens to translate the same upon axial translation of said rod for altering said focal length, a sleeve surrounding said rod, bearings to axially fix the position of said sleeve, a pin to couple said sleeve in the slot of said rod for rotation of said sleeve by said rod at any axially translated position of said rod, means to axially translate said converging lens, an electrical solenoid to engage said means to axially translate said converging lens with said sleeve, a switch to energize said solenoid, an iris shutter to adjust said aperture, a second electrical solenoid to engage said iris shutter with said sleeve, a second switch to energize said second solenoid; said variable focal length lens varied in focal length by translating said rod, varied in focus by simultaneously rotating said rod and actuating said switch, and varied in aperture by simultaneously rotating said rod and actuating said second switch.

5. In a variable focal length lens adjusting mechanism having only axially translatable converging lens, diverging lens, and a second converging lens, unitary manually operated means for altering the focal length of said variable focal length lens and for focusing the same comprising, operative rod-like means detachably connected to said diverging lens to translate the same upon axial translation of said rod-like means, a sleeve upon said rod-like means, means to axially fix the position of said sleeve, mechanical projecting means to couple said sleeve to said rod-like means for rotation of said sleeve by said rod-like means at any axially translated position of said rod-like means, mechanical means to axially translate said converging lens, electromagnetic means to engage said means-to-axially-translate with said sleeve, a switching means to energize said electromagnetic means; said variable focal length lens varied in focal length by translation of said rod-like means and varied in focus by rotation of said rod-like means with simultaneous actuation of said switching means.

6. In a variable focal length lens adjusting mechanism having, in order, a first converging lens, a diverging lens and a second converging lens, all movable, with said second converging lens mechanically linked to said first converging lens; single manual means for altering the focal length of said variable focal length lens and for optionally focusing the same comprising, an operative rod attached to said diverging lens to translate the same upon axial translation of said rod, a sleeve having a gear surrounding said rod, means to axially fix the position of said sleeve, means to couple said sleeve to said rod for rotation of said sleeve by said rod at any axially translated position of said rod, means to axially translate said first converging lens by the rotation thereof, gears to rotate said converging lens, translative electro-mechanical means to engage one of said gears to rotate with the gear of said sleeve, a switch to energize said electro-mechanical means; said variable focal length lens varied in focal length by translation of said rod and varied in focus by simultaneously rotating said rod and actuating said switch.

7. The mechanism of claim 6, in which said rod has a hand grip and said switch is attached to said grip.

8. The mechanism of claim 7 in which said rod has an axial hole and an electrical connection between said switch and said electro-mechanical means passes through said axial hole.

9. The mechanism of claim 6, wherein bevel gears mesh to couple said sleeve to said means to rotate said converging lens and wherein said means to rotate also include a gear and pinion in a gear train with said bevel gears.

10. The mechanism of claim 9 wherein said electro-mechanical means is an electromagnet for axially moving said bevel gears into mesh.

11. The mechanism of claim 9 wherein said electro-mechanical means is a magnetic clutch and said means to rotate are gears constantly in mesh.

12. In a variable focal length lens adjusting mechanism having at least a first converging lens, a diverging lens and a second converging lens in that order, said second converging lens linked to said first converging lens for movement, single manual means for altering the focal length of said variable focal length lens and for optionally focusing the same comprising, a manually operative rod attached to said first diverging lens to translate the same upon axial translation of said operative rod, a gear fastened to said rod, at least one stationary rod, a journal for said gear slidably disposed upon said stationary rod, an elongated pinion disposed parallel to said operative rod and meshed for rotation by said gear at any axially translated position of said operative rod, means to axially translate said first converging lens, an electrically controlled clutch, said clutch disposed between said pinion and said means-to-axially-translate said first converging lens, and a switch to energize said clutch; said variable focal length lens varied in focal length by translating said operative rod and varied in focus by simultaneously rotating said operative rod and actuating said switch.

References Cited in the file of this patent

UNITED STATES PATENTS

| | | |
|---|---|---|
| 1,947,669 | Warmisham | Feb. 20, 1934 |
| 1,950,166 | Durholz | Mar. 6, 1934 |
| 2,159,394 | Mellor et al. | May 23, 1939 |
| 2,165,341 | Capstaff et al. | July 11, 1939 |
| 2,454,686 | Bach | Nov. 23, 1948 |
| 2,532,685 | Walker | Dec. 5, 1950 |
| 2,547,187 | Walker | Apr. 3, 1951 |
| 2,720,817 | Mills | Oct. 16, 1955 |
| 2,732,763 | Back et al. | Jan. 31, 1956 |
| 2,753,758 | Walker | July 10, 1956 |